…

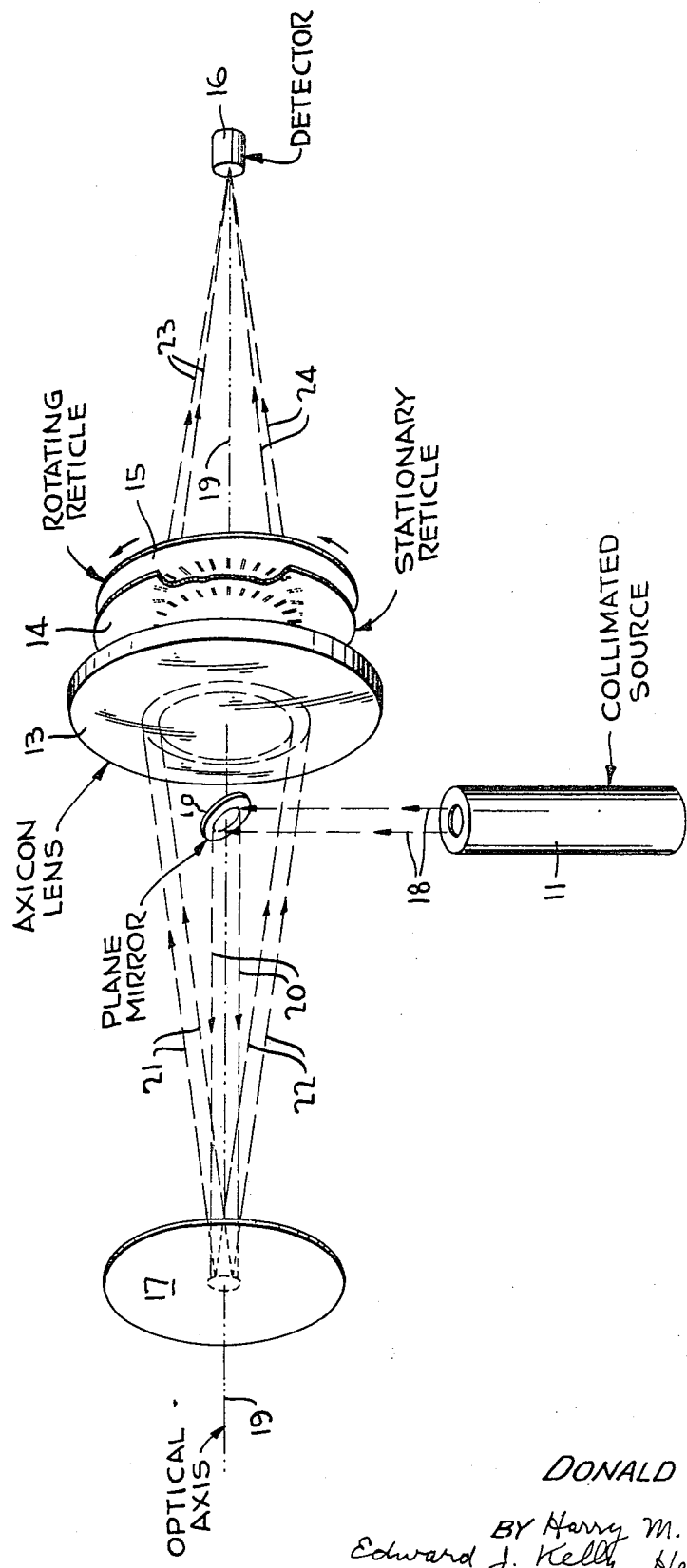

United States Patent Office

3,523,731
Patented Aug. 11, 1970

3,523,731
OPTICAL RANGING DEVICE (U)
Donald J. Mary, Hyattsville, Md., assignor to the United States of America as represented by the Secretary of the Army
Filed Jan. 4, 1967, Ser. No. 607,612
Int. Cl. G01c 3/08
U.S. Cl. 356—4            4 Claims

ABSTRACT OF THE DISCLOSURE

A collimated light source is reflected off an object through an axicon lens past a fixed and rotating recticle to a detector. The fixed and rotating reticles direct a series of light pulses to the detector, the frequency of the light pulses being indicative of the distance of the object to the axicon lens.

---

This invention relates to the optic arts and in particular to an optical ranging device particularly adapted for, but not limited to, measuring distances less than 100 feet.

Measurements of ranges of relatively close objects (less than 100 feet) present a particular problem if the distance to the object is subjected to rapid variation. Where the object is moving, in order to record accurately the distance to the object at a particular instant, the actual measuring of the object distance must be rapidly done so the object will not appreciably move during the measuring period. Prior art devices to measure distances to an object include the use of short range radar and various optical schemes. These devices are generally complex, delicate and/or require long periods of time in which to measure the distance to the objects making them unsuitable for measuring the distances to rapidly moving objects.

It is therefore an object of this invention to provide means to rapidly determine the distance to an object.

It is a further object of the present invention to provide means to determine the distance to an object that is rugged and utilizes a minimum of moving parts.

Another object of the present invention is to provide means to rapidly determine the distance to an object, even when the distance to said object is less than 100 feet.

A further object of the present invention is to provide means to determine if an object is at a particular distance.

Still another object of the present invention is to provide means to determine the range and velocity of a distant object.

Briefly, the present invention reflects a collimated light source off an object through an axicon lens and through a fixed and rotating reticle to an optical detector. The frequency of light pulses measured by the detector is an indication of the distance to the object.

Other objects and aspects of the invention will be apparent from the following description and drawing wherein:

The figure is a schematic representation of an embodiment of the present invention.

In the figure a collimated light source 11 is shown positioned to direct rays against a plane mirror 10. The mirror is positioned to direct the collimated rays against an object 17. Mirror 10 and object 17 are positioned along a common optical axis 19. Mirror 10 is positioned to direct the light from collimated source 11 to object 17 along common axis 19. Positioned on the side of mirror 10 away from object 17 is an axicon lens 13. The axis of axicon lens 13 is identical with common axis 19. An axicon lens is a figure of revolution that has the property that a point source on its axis of revolution is imaged to a line along its axis. In the embodiment of the figure, the axis of revolution of axicon lens 13 is identical with common axis 19. Because of the axicon's ability to transfer a point source to a line image along its axis it does not have a definite focal length as the term is used in the art. A more detailed description of an axicon lens can be found in the "Journal of The Optical Society of America," vol. 44, No. 8, August 1954, in an article entitled "The Axicon, A New Type of Optical Element" by John H. McLeod. Positioned on the side of the axicon lens away from mirror 10 is a fixed reticle 14 and a rotating reticle 15. Rotating reticle 15 can be rotated in any of the well known ways. The reticle used in this invention is an object having a series of annular sections. Alternate parts of each annular section are opaque and alternate parts of each annular section are transparent. While I use a circular reticle in the preferred embodiment of the invention it is to be understood that other geometric configurations of a reticle could be used without departing from the scope of my invention. Going towards the circumference of each reticle in each annular section the number of alternating opaque and transparent sections will increase in number from the preceding annular section, the latter being closer to the reticle center. In the figure the reticles are shown as positioned a short distance away from axicon lens 13 but this is for illustrative purposes only and in actual practice the reticles will be adjacent the axicon lens. Common axis 19 will pass through each reticle and positioned a short distance from the reticles, on the side away from axicon lens 13 and along common axis 19, is a detector 16. Detector 16 could be any of the conventional means available for detecting a series of pulses of light and producing a signal indicative of the series of pulses of light.

Collimated source 11 directs rays in the direction of arrows 18 to mirror 10 which directs the rays in a direction indicated by arrows 20 toward object 17 along common axis 19. The collimated rays will be reflected by object 17 towards axicon lens 13 along a path indicated by arrows 21 and 22 for a particular distance from the object to the lens. The closer object 17 is to axicon lens 13 the reflected rays from object 17 that are incident on the detector will be closer to the center of the axicon lens. The light will pass through axicon lens 13 and through the stationary and rotating reticle and to detector 16 along a path indicated by arrows 23 and 24. Since one reticle 15 is moving and another is fixed the collimated light passing through an annular section of the reticles will be picked up by detector 16 when a transparent part of an annular section of a reticle is aligned with a transparent part of an identical annular section of the other reticle. As one reticle 15 is rotating the result will be a series of pulses of light which detector 16 will pick up.

Since each annular section of the reticles has a distinct number of alternate transparent and opaque sections, each annular section will produce a series of light pulses having a distinct frequency which detector 16 will respond to. As the distance of object 17 to axicon lens 13 determines how far the reflected light from object 17 is from the axicon lens center, and hence at what annular section of the reticles the reflected light will pass through, it can be seen the frequency of the light passed through the reticles as detected by detector 16, is a measurement of the distance from the axicon lens to the object.

If it were desired to record the velocity of object 17 it would only be necessary to determine the rate of change of distance with respect to time. Thus the rate of change of frequency with respect to time as determined by detector 16 will be a measurement of velocity.

A further modification would be to include an amplifier circuit for detector 16 sensitive to a narrow range of frequencies which would correspond to a certain distance range of object 17 from axicon lens 13. This detector and the amplifier circuit would only respond to a specified distance which object 17 would have to be at.

It is anticipated that a point source of light could be placed where detector 16 is and the detector placed where the collimated source 11 is. An arrangement such as this would have the advantage of the detector not seeing background light modulated by the reticle. However, in order to achieve an appreciable operating range it is envisioned that a laser would be used in this arrangement.

It will be apparent that the embodiments shown are only exemplary and that various modifications can be made in construction and arrangement within the scope of the invention as defined in the appended claims.

I claim as my invention:

1. An optical ranging device comprising:
   (a) a source of light;
   (b) means to direct said light to an object whose range is to be measured;
   (c) an axicon lens for collecting a portion of said light reflected from said object and producing a line image along its axis;
   (d) means for interrupting said collected light to produce light pulses having a predetermined frequency; and
   (e) means for detecting the frequency of said light pulses, whereby the frequency of said light pulses provides a measure of the range of said object.

2. The device of claim 1 wherein said means for producing light pulses comprises a pair of reticles having alternate opaque and transparent sections.

3. The device of claim 2 wherein at least one of said reticles is rotating and both of said reticles are located along the axis of said axicon lens.

4. The device of claim 1 wherein said means for detecting comprises a photo-detector and said means to direct light to an object comprises a mirror, both said photo-detector and said mirror being located along the axis of said axicon lens.

References Cited

UNITED STATES PATENTS

| | | | |
|---|---|---|---|
| 3,006,233 | 10/1961 | Stiles et al. | 356—28 |
| 3,129,424 | 4/1964 | Rabinow | 356—4 XR |
| 3,348,050 | 10/1967 | Bez | 356—4 XR |
| 3,432,237 | 3/1969 | Flower et al. | 356—28 |

RODNEY D. BENNETT, JR., Primary Examiner

J. P. MORRIS, Assistant Examiner